(12) United States Patent
Chang et al.

(10) Patent No.: US 11,603,017 B2
(45) Date of Patent: Mar. 14, 2023

(54) QUERY REWRITING AND INTERACTIVE INQUIRY FRAMEWORK

(71) Applicant: Microsoft Technology Licensing, LLC, Redmond, WA (US)

(72) Inventors: Keng-hao Chang, San Jose, CA (US); Ruofei Zhang, Mountain View, CA (US); Zi Yin, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 237 days.

(21) Appl. No.: 16/877,410

(22) Filed: May 18, 2020

(65) Prior Publication Data

US 2020/0317093 A1 Oct. 8, 2020

Related U.S. Application Data

(63) Continuation of application No. 15/612,555, filed on Jun. 2, 2017, now Pat. No. 10,654,380.

(Continued)

(51) Int. Cl.
*G06F 16/00* (2019.01)
*B60N 2/28* (2006.01)
*G06F 16/93* (2019.01)
*G06F 16/242* (2019.01)
*G06F 16/33* (2019.01)

(Continued)

(52) U.S. Cl.
CPC ......... *B60N 2/2806* (2013.01); *G06F 16/243* (2019.01); *G06F 16/3344* (2019.01); *G06F 16/93* (2019.01); *G06N 3/0445* (2013.01); *G06N 3/08* (2013.01); *B60N 2002/2815* (2013.01); *B60N 2002/2818* (2013.01)

(58) Field of Classification Search
CPC .......... B60N 2/2806; B60N 2002/2815; B60N 2002/2818; G06F 16/243; G06F 16/93; G06F 16/3344; G06N 3/0445; G06N 3/08
See application file for complete search history.

(56) References Cited

U.S. PATENT DOCUMENTS 9,785,638 B1 * 10/2017 Eveland ................ G06F 16/242
2010/0228710 A1 * 9/2010 Imig .................... G06F 16/9535
707/706

(Continued)

OTHER PUBLICATIONS

Dong et al., Language to Logical Form with Neural Attention, Jun. 6, 2016, retrieved on Sep. 12, 2019, retrieved from the Internet <URL: https://arxiv.org/abs/1601.01280 > (Year: 2016).*

(Continued)

*Primary Examiner* — Tyler J Torgrimson

(57) ABSTRACT

The present application describes a system and method for converting a natural language query to a standard query using a sequence-to-sequence neural network. As described herein, when a natural language query is receive, the natural language query is converted to a standard query using a sequence-to-sequence model. In some cases, the sequence-to-sequence model is associated with an attention layer. A search using the standard query is performed and various documents may be returned. The documents that result from the search are scored based, at least in part, on a determined conditional entropy of the document. The conditional entropy is determined using the natural language query and the document.

20 Claims, 12 Drawing Sheets

Related U.S. Application Data

(60) Provisional application No. 62/423,930, filed on Nov. 18, 2016.

(51) Int. Cl.
*G06N 3/08* (2023.01)
*G06N 3/04* (2023.01)

(56) References Cited

U.S. PATENT DOCUMENTS

| | | | |
|---|---|---|---|
| 2014/0236579 A1* | 8/2014 | Kurz | G06F 16/3344 704/9 |
| 2015/0254232 A1* | 9/2015 | Ahmed | G06F 16/367 704/9 |
| 2017/0270190 A1* | 9/2017 | Wang | G06F 16/335 |

OTHER PUBLICATIONS

Seppo, Quantities of information and probability theory, retrieved on Apr. 7, 2022, retrieved from the Internet <URL: https://senarvi.github.io/quantities-of-information-and-probability-theory/> (Year: 2015).*

* cited by examiner

QUERY REWRITING AND INTERACTIVE INQUIRY FRAMEWORK

CROSS-REFERENCE TO RELATED APPLICATIONS

This application is a continuation of U.S. patent application Ser. No. 15/612,555, filed on Jun. 2, 2017, issued as U.S. Pat. No. 10,654,380, which application claims the benefit of U.S. Provisional Application Ser. No. 62/423,930 filed Nov. 18, 2016, the complete disclosures of which are hereby incorporated by reference in their entireties.

BACKGROUND

Understanding and processing information contained in natural language queries expressing user intent is a major challenge in document selection. User queries in the form of natural language are usually fuzzy and implicit, which makes it hard to be processed by existing information retrieval systems, often requiring multiple user interactions for further clarification.

For example, when a natural language query is received in current information retrieval systems, the natural language queries are simplified by removing certain stop words (e.g., words such as "how" and "to"). As a result, only key terms within the natural language query remain and documents containing these key words are retrieved and returned to the user. However, such an approach may not capture the intent of the natural language query. As a result, any searches executed on the remaining terms may not produce results that are in line or otherwise correspond to the intent of the individual that submitted the natural language query.

SUMMARY

Non-limiting examples of the present disclosure describe a method for converting a natural language query into a standard query that a search engine can understand. In some examples, the method includes receiving a natural language query and converting the natural language query to a standard query using a sequence-to-sequence model and an associated attention layer. Once the standard query is generated, a search, using the standard query is performed and one or more documents may be received as a result of the search. The one or more documents are then scored. In some examples, the score is based, at least in part, on the conditional entropy of the document. The conditional entropy is determined using the natural language query and the document. The document is then returned to the individual that submitted the natural language query.

Further non-limiting examples of the present disclosure describe a system for retrieving information using sequence-to-sequence neural networks. The system includes at least one processor and a memory operatively connected with the at least one processor storing computer-executable instructions that, when executed by the at least one processor, causes the at least one processor to execute a method that includes receiving a natural language query and converting the natural language query to a standard query using a sequence-to-sequence model. A search using the standard query is then performed and search results from the standard query are received. The search results are then scored based, at least in part, on the natural language query and the document. The document is returned if the score of the document is greater than a threshold value.

Also described is a method, comprising converting a received natural language query to a standard query using a sequence-to-sequence model and an attention layer and performing a search using the standard query. A document that results from the search is then received and the document is scored based, at least in part, on a determined conditional entropy of the document. In some cases, the conditional entropy is determined, at least in part, by using the natural language query and the document. Once the document is scored, the document is returned to the individual that submitted the natural language query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
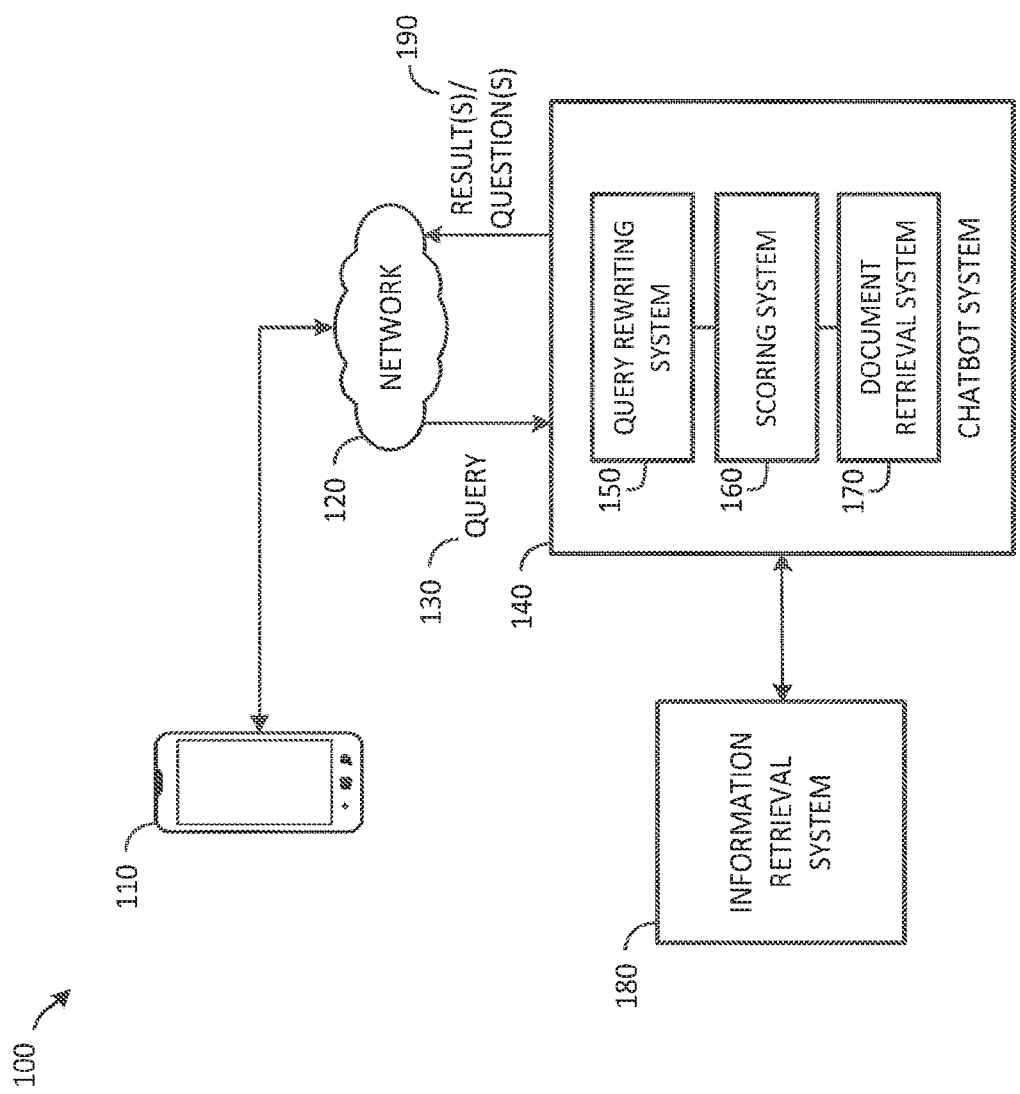
FIG. 1 illustrates an example system that is used to rewrite received queries and provide one or more documents based on the received query according to an example.

Examples of the present disclosure describe a query understanding and recommendation system. More specifically, the present disclosure describes an attention based sequence-to-sequence recurrent neural network that is used to rephrase received natural language queries or other input, evaluate the input, actively generate questions to receive additional input when necessary and leverage the generative ability and likelihood estimation provided by the sequenceto-sequence model. In some cases and as will be described herein, the system of the present disclosure may be configured to make decisions based on a derived uncertainty (entropy) measure that is based, at least in part, on received input. In some cases, the input may consist of multiple rounds of interaction between the individual that submitted the natural language query and the system.

Examples disclosed herein describe systems and methods for responding to queries from various individuals. The system includes a versatile sequence-to-sequence model consisting of a deep Long-Short Term Memory ("LSTM") network augmented with an attention network. For example, an information-directed framework to integrate sequence-to-sequence neural networks is provided. The framework uses a sequence-to-sequence model to process natural language information from question-like queries and rewrites them in a standard query form. The system also uses probabilistic scores generated by the sequence-to-sequence model to determine appropriate documents as the answer to the queries. If confidence is not established for determining the appropriate documents, an individual that submitted the natural language query is proved with additional clarifying questions that are generated by the system. As used herein, a document may include any electronic record that provides information, including, but not limited to, web pages with text, graphics, images, and targeted content.

As will be described herein, the deep sequence-to-sequence model is a neural network that can rewrite the received query. In some cases, the sequence-to-sequence model is used for processing natural language prior to generating a standard query that is based on the received query. In particular, natural language queries are rewritten using the sequence-to-sequence model and sent to an information retrieval system. In contrast to prior art systems that provide static drop down lists for users to interact with in narrowing down search results, the present disclosure uses probabilistic scores generated by the sequence-to-sequence model to choose the most effective question to probe the user—also referred to herein as entropy-based decision making.

As will be described below, the system of the present disclosure may include a query rewriting system, a scoring system and a document retrieval system. In some cases, the document retrieval system may include a chatbot or other artificial intelligence entity that may be used to interact with an individual and provide documents or other recommendations to the individual in response to received input.

In some examples, the query rewriting system includes a sequence-to-sequence model that rewrites a received natural language query from an individual into a format (e.g., a standard query formal) that is understandable by a recommendation and/or a search system. The scoring system is used to determine a relevance score of a returned document when compared with the received query. Lastly, the document retrieval system may include a chatbot or other artificial intelligence entity that interacts with the individual, generates and asks additional questions to maximize informational gain and returns various documents to the individual.

FIG. 1 illustrates an example system 100 that is used to rewrite received queries and provide one or more documents based on the received query. In some examples, an individual may submit a query (shown as query 130) to the computing device 110. The query 130 may be provided to the computing device 100 using speech, text, sound, audio files, video or video files and the like.

In some examples, the computing device 110 is a personal or handheld computer having both input elements and output elements. For example, the computing device 110 may be one of: a mobile telephone; a smart phone; a tablet; a phablet; a smart watch; a wearable computer; a personal computer; a desktop computer; a laptop computer; a gaming device/computer (e.g., XBOX); a television; and the like. This list is for example purposes only and should not be considered as limiting and any computing device that may accept a query from an individual may be utilized.

Once the query 130 has been provided by the individual, the query 130 is provided over a network 120 to a chatbot system 140. The chatbot system 140 may then rewrite the received query 130 into a search query using a query rewriting system 150 and perform a search for relevant documents, score the returned documents using a scoring system 160 and provide one or more documents that relate to the query 130 using a document retrieval system 170. In some cases, the document retrieval system 170 may also generate various follow up questions to ensure that the most relevant documents are returned.

In some examples, the query 130 is a natural language query. As such, each of the systems mentioned above will be described below with references to an example natural language query of "How to connect my tablet to a TV."

If this example query is provided to a standard information retrieval system, the standard information retrieval system may find it difficult to provide a relevant answer (e.g., a micro HDMI cable) as the query does not contain keyword that are related to the query (e.g., use the word "cable").

Accordingly, the query 130 may be provided to a query rewriting system 150 associated with the chatbot system 140. In some examples, the query rewriting system 150 may utilize a sequence-to-sequence model to transform the query 130 from a first format (e.g., the natural language format) to a second format (e.g., a search query format).

Figure 2:
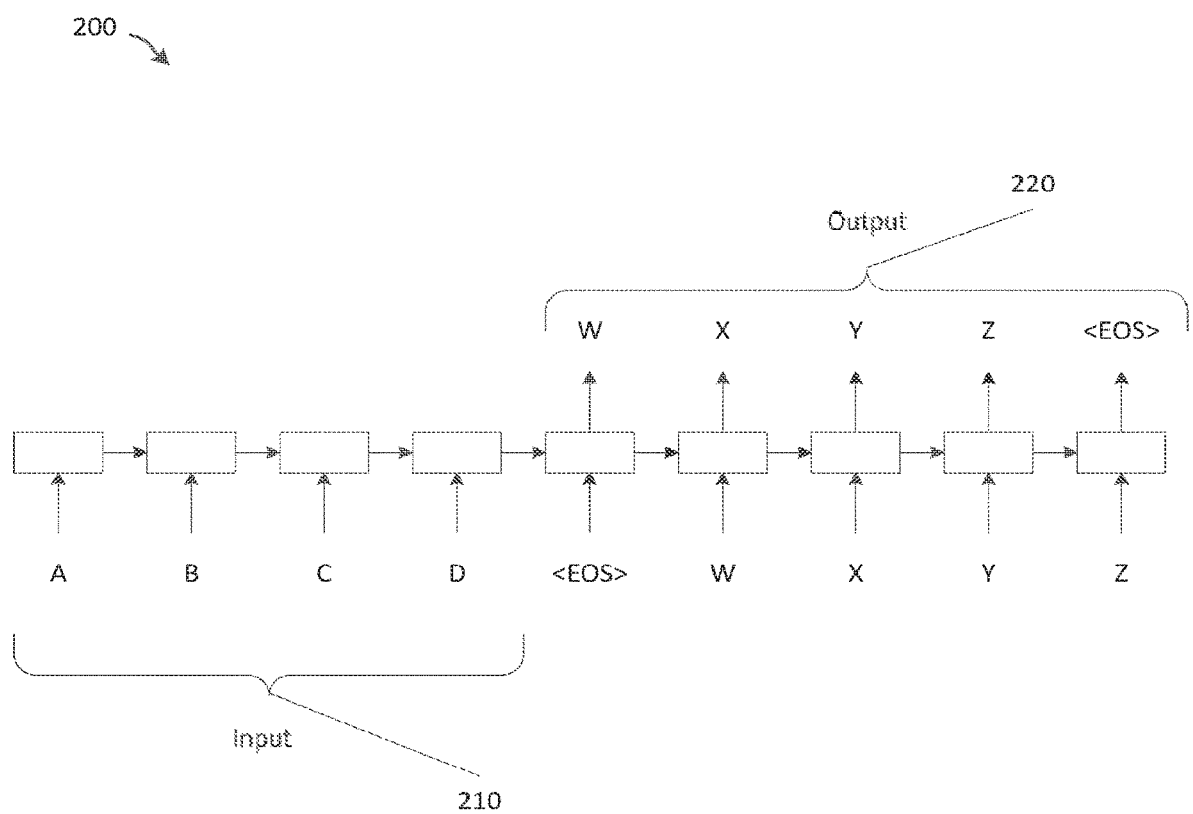
FIG. 2 illustrates a natural language query being rewritten through the use of a sequence-to-sequence model according to an example.

FIG. 2 illustrates how a natural language query received in a first format may be rewritten to a second format using a sequence-to-sequence model 200. For example, using a recurrent neural network, such as a long short-term memory (LSTM) network, the query 130 may be rewritten from a natural language query into a search query. The search query may then be sent to an information retrieval system (e.g., information retrieval system 180) to generate results for the original query 130.

As shown in FIG. 2, the sequence-to-sequence model 200 may include two parts: an encoder 210 that receives input and a decoder 220 that generates output. In general, the encoder 210 embeds a source string (e.g., inputs shown as A, B, C, D in FIG. 2) into hidden vectors by leveraging the LSTM to transform each input and embed the inputs into hidden states. While the example shown in FIG. 2 illustrates a single layer LSTM, the sequence-to-sequence model of the present disclosure may incorporate multiple layers.

However, for purposes of simplicity, the functionality of the single layer LSTM will be described followed by a description of a multiple layer LSTM. In the single layer LSTM such as shown in FIG. 2, each input (e.g., a word from a query such as, for example, query 130 of FIG. 1) is encoded and fed into the encoding of the next input. For example, the input A is encoded and is fed into the encoder of input B, which receives both encoded A and B. Likewise, the encoder of input C receives the encoded combination of A and B as well as the encoded C. This process continues for each input until the end of string ("<EOS>") is detected.

The decoder 220, shown under outputs W, X, Y, and Z, receives the hidden vectors that were generated by the encoder 110, as well as the end of string ("<EOS>") as inputs and projects a probabilistic score of dictionary size |V|. This is represented as output W. The sequence-to-sequence model 200 uses the predicted output W as the input with the highest likelihood as being associated with the original input as the first rewritten input. Afterwards, it takes the output W as the input to predict the next word and the process repeats until the <EOS> is reached.

Figure 3:
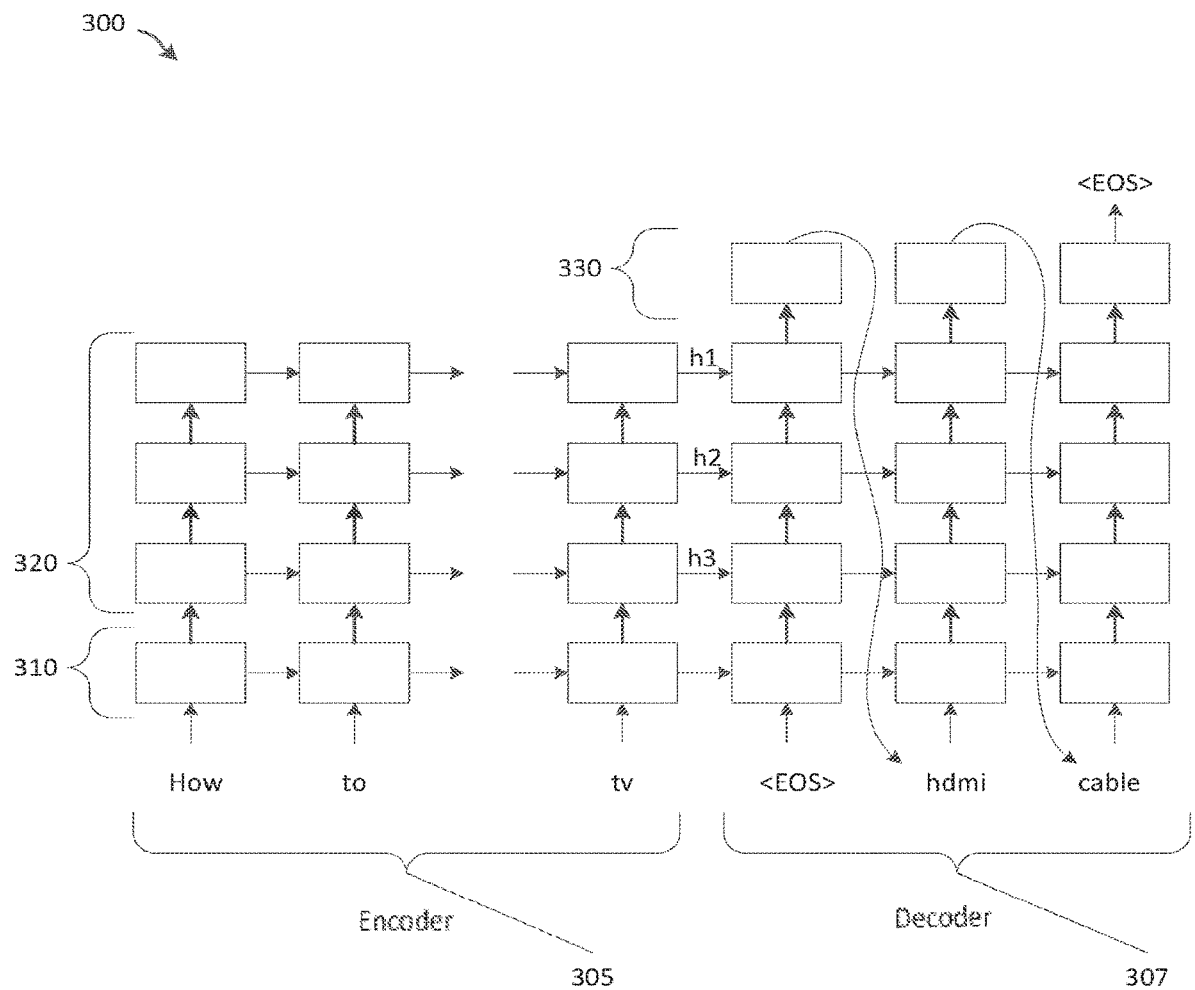
FIG. 3 illustrates a natural language query being rewritten through the use of a multi-level sequence-to-sequence model according to an example.

Although FIG. 2 illustrates a single layer LSTM, the sequence-to-sequence model associated with the query rewriting system 150 may use a multilayer LSTM. For example, FIG. 3 illustrates how a natural language query may be rewritten through the use of a multi-level sequence-to-sequence model 300. As described above with respect to FIG. 2, once the natural language query has been rewritten to a search query, the search query is sent to an information retrieval system to generate results.

As with the sequence-to-sequence model 200 described above, the sequence-to-sequence model 300 may include two parts: an encoder 305 that receives input and a decoder 307 that generates output. However, the sequence-to-sequence model 300 includes three layers of stacked LSTM blocks. Although three layers are shown, the sequence-to-sequence model 300 may include any number of different layers.

The encoder 305 embeds each word of a source string (in this example, the source string is "How to connect my tablet to a TV"), into hidden vectors by leveraging each of the LSTM layers 320 to transform each word that is received into an embedding layer 310 into hidden states h1, h2, and h3.

For example, in some cases the sequence-to-sequence model 300 may be associated with a vocabulary |V| of a certain size (e.g., 100 k). The vocabulary may be used for both the encoder 305 and the decoder 307. In some cases, any word in the source string that is not found in the vocabulary may be assigned a symbol <UNK>. In some cases, the embedding layer 310 may be associated with an embedding dimension (e.g., 100) and the hidden vectors may also be associated with a vector size (e.g., 300).

Once the source string (e.g., "How to connect my tablet to a TV") is received, the embedding layer 310 receives each word and converts each word into a vector representation.

As described above, the sequence-to-sequence model 300 includes various stacks of LSTM blocks. Each LSTM block is configured to take three inputs: $e_t$, $e_{t-1}$ and $h_{t-1}$ where $e_t$ is the input from below the given block in the LSTM and $c_{t-1}$ and $h_{t-1}$ are inputs from a previous block. The output, represented below as $h_t$, is computed using the following formulas:

$$i_t = \sigma(W_{ei}e_t + W_{hi}h_{t-1} + b_i)$$

$$f_t = \sigma(W_{ef}e_t + W_{hf}h_{t-1} + b_f)$$

$$e_t = f_t \cdot c_{t-1} + i_t \cdot \tan h(W_{ec}e_t + W_{hc}h_{t-1}b_c)$$

$$o_t = \sigma(W_{eo}e_t + W_{ho}h_{t-1} + b_o)$$

$$h_t = o_t \cdot \tan h(c_t)$$

where the dot "·" denotes an element-wise product between vectors.

Stated another way, once a particular word has been embedded or otherwise represented as a hidden vector, each word is fed into the encoding of the next word. For example, the word "How" is encoded and is fed into the encoder of "to", which receives both "How" and "to". This process repeats for each word in the string until the <EOS> symbol is identified.

Once the input string has been fully encoded, the decoder 307 takes the hidden vectors and the end of string <EOS> word as inputs and projects a probabilistic score of dictionary size |V|. Then, it picks the word with the highest likelihood as the first rewritten word in projection layer 330.

Afterwards, it takes the predicted word as the input to predict the next word and the process repeats. Then, it finishes rewriting when the model generates an <EOS> word again. In this example, "How to connect my tablet to a TV" is rewritten to "HDMI cable." In some cases, a search may be performed using the rewritten query to return relevant documents.

Figure 4:
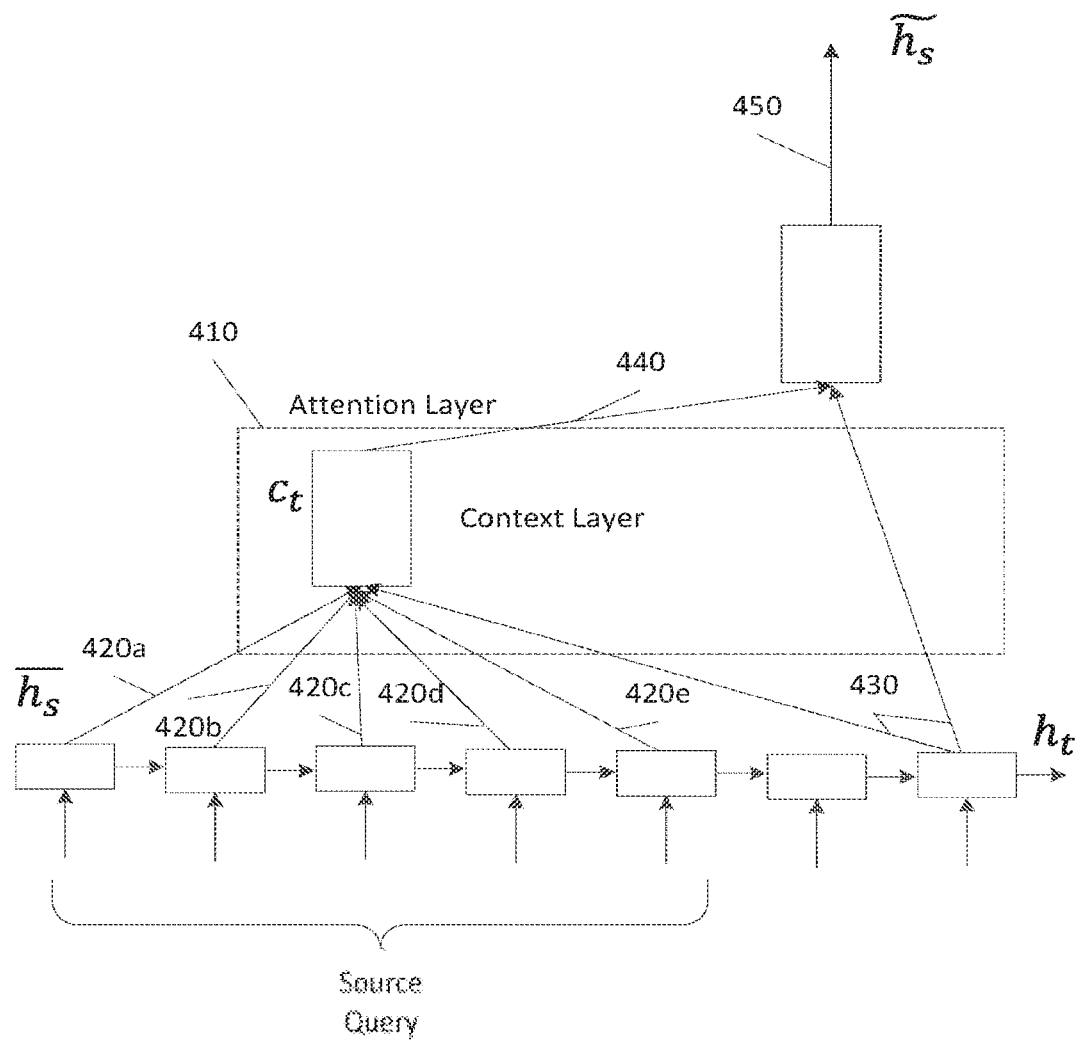
FIG. 4 illustrates an attention layer that may be associated with a sequence-to-sequence model to identify important words in a query to facilitate rewriting of a query according to an example.

In some cases, the projection layer 330 may also be used in conjunction with an attention layer 410 such as shown in FIG. 4. When an attention layer 410 is included or otherwise associated with the sequence-to-sequence model 300, the projection layer 330 may take the combined hidden vector and attention layer vector as input and may output a vector of dimension IV I.

Referring to FIG. 4, FIG. 4 illustrates an attention layer 410 that may be combined or otherwise associated with a sequence-to-sequence model and used to identify important words in a query (e.g., query 130 of FIG. 1). Thus, the attention layer 410 may be used to facilitate rewriting operations such as described herein.

In some cases, the attention layer 410 aggregates the hidden vectors associated with the query 130 (represented in FIG. 4 as $\overline{h_s}$, 420a-e) by their similarity against a hidden vector in the decoder, $h_t$ 430. The aggregation function can be considered as a function $f$ that takes all source query hidden vectors 420a-e and the hidden vector 430 in decoder as inputs, such that $c_t = f(h_s^1, \ldots, h_s^m, h_t)$. Then, the resulting vector, $c_t$, 440 is concatenated against decoding hidden vector $h_t$ and fed into the projection layer as $\widetilde{h_s}$ 450. This attention mechanism improves, not only model effectiveness, but also identifies important/entity-like words via the similarity between source query words and the decoded word.

In some cases, and in addition to the rewrites discussed above, search click data may also be used to rewrite natural language queries to queries that may be provided to an information retrieval system. In this way, more relevant documents can be retrieved by sending the rewritten queries to the information retrieval systems.

Referring back to FIG. 1, once the query rewriting system 150 has generated the rewritten query, the rewritten query may be used to search for documents in an information retrieval system. When a document is returned, the scoring system 160 compares each returned document in light of rewritten query to determine a relevance score. The relevance score may then be provided to the document retrieval system 170 that may either perform additional searches, generate and ask follow up questions 190 to the individual that submitted the original query 130, and/or provide the highest ranked document (represented as results 190) back to the individual. In some instances, the document retrieval system may be implemented as a chatbot or other artificial intelligence entity that is configured to interact with the individual.

Figure 5:
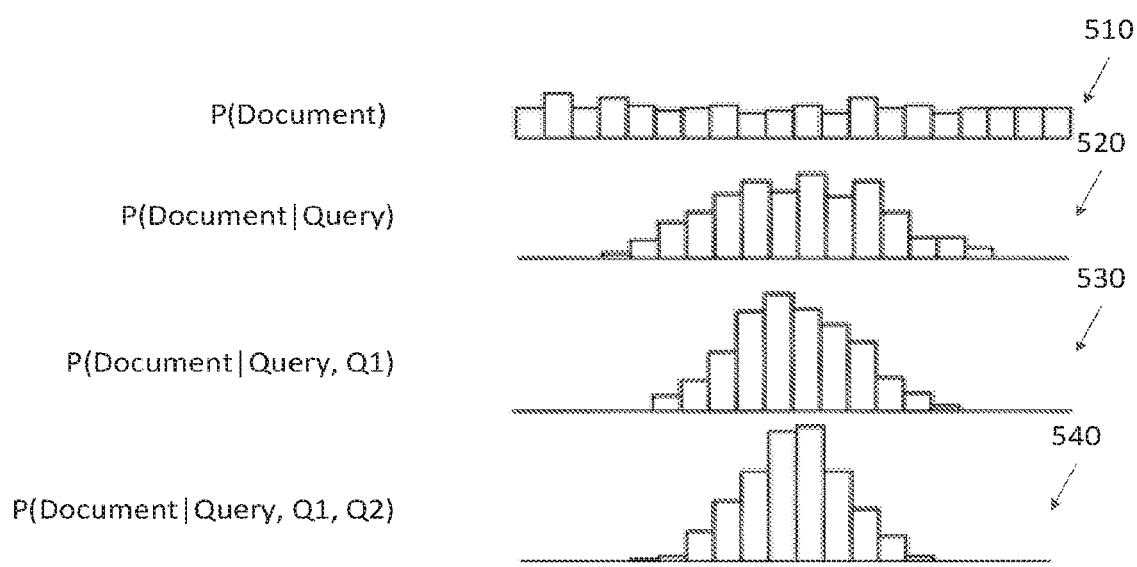
FIG. 5 illustrates probabilities of various documents being presented in light of particular queries and follow-up questions according to an example.

In some cases, the scoring system 160 may use a probabilistic approach to determine relevance. FIG. 5 illustrates probabilities of various documents being presented in light of particular queries and follow-up questions that may be generated by the document retrieval system 170. In some cases, follow-up questions may be generated and provided to the individual when the confidence level or score of the results of the rewritten query is not above a threshold. In such circumstances, one or more follow-up questions may be generated and provided to the individual.

For example, and as shown in FIG. 5, a range of probabilities may exist for search results from a particular query. For example, the probability distribution 510 is the result of the probability of returning any given document if no query has been made. Probability distribution 520 is the probability of a document given a particular query. Note that the probability of particular documents is increased as the query has been provided. Probability distribution 530 shows how the probabilities of particular documents are tightened when an additional follow-up question, Q1, is generated, provided to the individual and in which an answer is received. Finally, the Probability distribution 540 illustrates the probability of a particular document given a query and responses to two follow-up questions. Each follow-up question further enhances the probabilities of certain documents being provided to the user.

The scoring system 160, may be used to generate a probabilistic score using the following equations and the associated description. To start with, the probability P may be represented as follows:

P(Query|Document)

As the individual interacts with the chatbot (e.g., as the individual provides a query and/or various follow-up answers represented as $Query_1$, $Query_2$, . . . , $Query_n$), the joint likelihood of receiving a document that is associated with a given query is estimated using a Naïve Bayes method:

$P(Query_1, \ldots, Query_n | Document) = P(Query_1 | Document) \ldots P(Query_n | Document)$ The estimate for the prior distribution on the document may be set using its empirical distribution $$P(\text{Document}) = \frac{\text{number of this document}}{\text{number of total documents}}$$

which corresponds to a flat prior as the documents are unique.

The joint distribution on the set of documents and user queries is estimated by: $P(Document, Query_1, \ldots, Query_n) = P(Query_1, \ldots, Query_n | Document) P(Document)$.

Lastly the posterior distribution of a document given the queries is estimated by:

$$P(\text{Document} | Query_1, \ldots, Query_n) = \frac{P(Query_1, \ldots, Query_n | \text{Document}) P(\text{Document})}{\Sigma_{Document} P(Query_1, \ldots, Query_n | \text{Document}) P(\text{Document})}.$$

Figure 6:
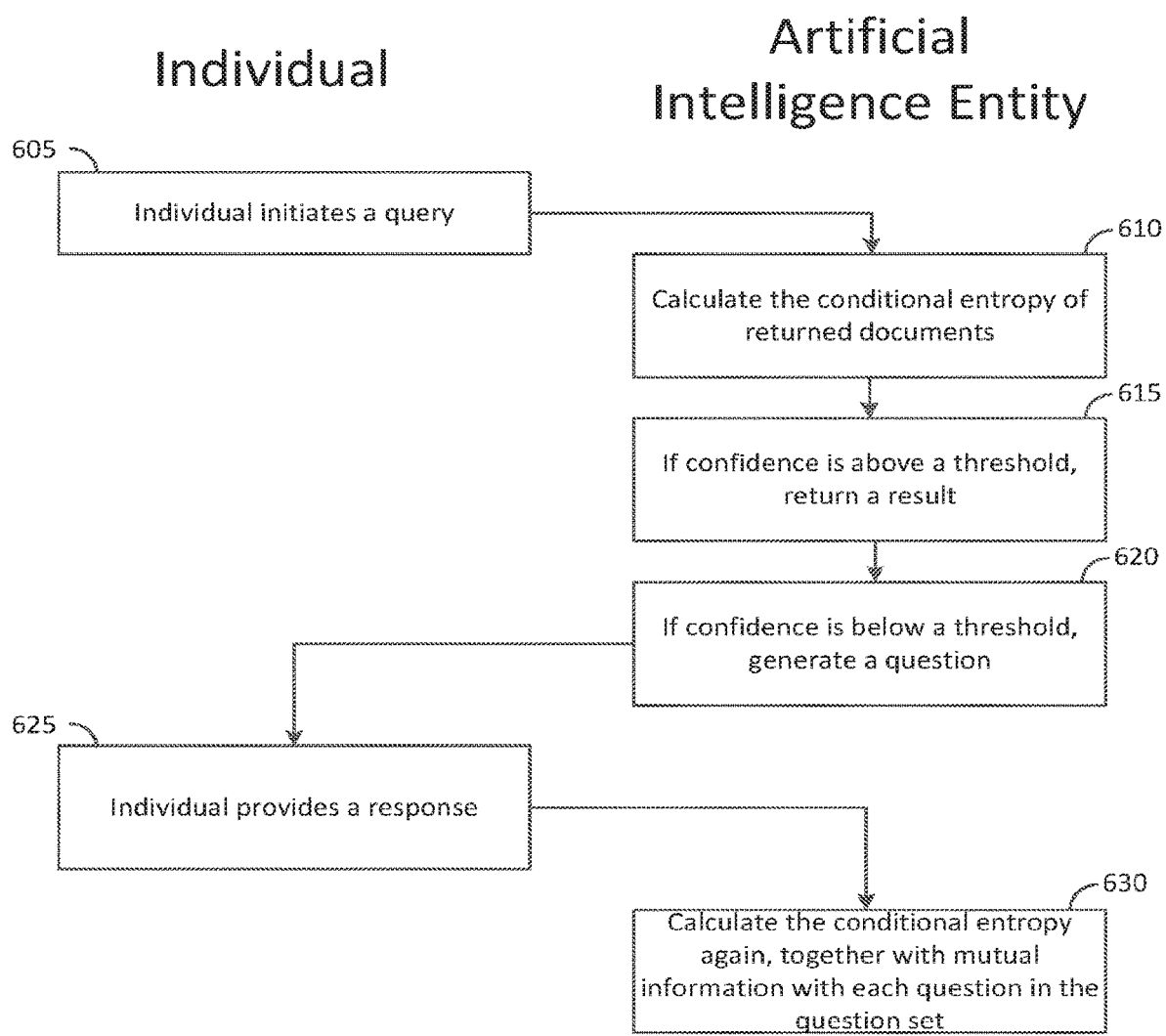
FIG. 6 illustrates an example interaction between an individual that submits a query and an artificial intelligence entity according to an example.

FIG. 6 illustrates an example interaction between an individual and an artificial intelligence entity or a chatbot that may be part of the system 100 described above with respect to FIG. 1. In some cases, the various systems described above with respect to FIG. 1 may be used to rewrite a received query, return documents, determine the relevancy of each document and generate additional questions as needed.

In the example shown in FIG. 6, the query may be provided 605 from an individual using a computing device. For example, the query may be provided to an artificial intelligence entity that is associated with a mobile phone, a tablet computing device, a laptop computing device, a desktop computing device and so on. In other cases, the artificial intelligence entity may be remote from the computing device. In yet other cases, the artificial intelligence entity may be provided on the computing device but have access to information that is stored on a separate system. For example, in some cases, once the query is received, the query is transmitted over a network to a query rewriting system such as described with respect to FIG. 1. In this example, the query that is received is a natural language query of "How to connect my tablet to a TV".

Once the query has been rewritten and various documents have been returned using the rewritten query as a search query, the artificial intelligence entity (or the system of which the artificial intelligence entity is associated with) calculates 610 a conditional entropy of the documents based on information contained in the query. In some cases, the conditional entropy is inversely related to a score or the document and/or a score associated with the rewritten query, together with mutual information with each question in a question set.

In some cases, the conditional entropy of a document given the a particular query provides the system with a perplexity measurement at the current stage of interaction between the individual and the artificial intelligence entity and may serve as the basis for determining a score for the documents.

For example, a low conditional entropy may result in the document having a high score thereby indicating that the document is relevant to the query. Conversely, if the conditional entropy is large or high, it indicates that the system is not able to make a precise recommendation because the information provided up to this point is not decisive.

In some cases, the conditional entropy can be estimated by the following equation:

$$H(\text{Document} | query_1, \ldots, query_n) = -\Sigma_{document} P(\text{Document} | query_1, \ldots, query_n) \log(P(\text{Document} | query_1, \ldots, query_n))$$

in which
the i-th query submitted by the individual can be an answer to a question represented as $Query_i = query_i$.

If the result of the conditional entropy indicates that the confidence of the system is above a threshold (e.g., that one or more returned documents will address the initial query) the artificial intelligence entity may respond 615 to the query "Do you want this mini HDMI cable".

However, if the conditional entropy indicates that the confidence of the system is below a threshold, the system may generate one or more follow up questions 620 (e.g., "What size of cable do you want?"). In some cases, the generated questions may be scored based on the amount of information the question will generate. For example, a question that won't require a second follow up question for the individual may be scored higher than a question that may require one or more additional follow up questions.

Stated differently, the perplexity measurement of a question may be associated with the conditional entropy. As such, the artificial intelligence entity may seek to generate a question that minimizes conditional entropy. For example, the artificial intelligence entity may generate a question for the individual such that the answer is a random variable $Query_{n+1}$, such that the expected conditional entropy $H(\text{Document} | query_1, \ldots, query_n, Query_{n+1})$ is minimized.

If the artificial intelligence entity decides to ask for further information if the entropy still exceeds a threshold T, the artificial intelligence entity may propose a question regarding a particular attribute about the documents. The attributes can be, for example, size, color, manufacture and so on. Each attribute has its associated set of answers, for example, for attribute color, answers may include red, blue, yellow etc. As a result, the artificial intelligence entity can use the Markov relation and estimate the joint distribution of the answer to that attribute as: P(Attribute, Document|query$_1$, ..., query$_n$)=P(Document|query$_1$, ..., query$_n$)P(Attribute|Document)

Further, this joint distribution can be used to estimate the mutual information between this particular attribution and the set of documents $$I(\text{Attribute; Document} | \text{query}_1, \ldots, \text{query}_n) = \sum_{Attribute, Document} \frac{P(\text{Attribute, Document} | \text{query}_1, \ldots, \text{query}_n)}{P(\text{Attribute} | \text{query}_1, \ldots, \text{query}_n) P(\text{Document} | \text{query}_1, \ldots, \text{query}_n)}$$

Accordingly, the artificial intelligence entity may generate and ask questions that maximizes the above quantity. For example, the question can be "What size of cable do you want?"

The answer to this question is taken as a new query Query$_{n+1}$=query$_{n+1}$. It reshapes the posterior either through the Bayesian procedure which involves the deep learning sequence-to-sequence model, or a binary keep/removal rule, i.e., keep documents that have matching attributes, and re-normalize the posterior distribution among those documents.

Because of the relation I(Attribute; Document|query$_1$, ..., query$_n$)=H(Document|query$_1$, ..., query$_n$)–H(Document|Attribute, query$_1$, ..., query$_n$) minimizing perplexity is equivalent to maximizing the expected information gain, which justifies the principle of information directed question formulation.

A variant for generating a question is proposed and tested based on the observation that I(Attribute; Document|query$_1$, ..., query$_n$)=H(Attribute|query$_1$, ..., query$_n$)–H(Attribute|Document, query$_1$, ..., query$_n$)

So to maximize the mutual information, the artificial intelligence entity can also choose the attribute that maximizes the entropy H(Attribute|query$_1$, ..., query$_n$) and formulate a question about this attribute.

Once the individual receives the question, the individual may provide a response 625. In this example, the response is "I want a mini HDMI cable." When this response is received, the artificial intelligence entity calculates 630 the conditional entropy or score, together with the mutual information with each question in the question set 630. This process continues until a result is provided to the individual.

Figure 7:
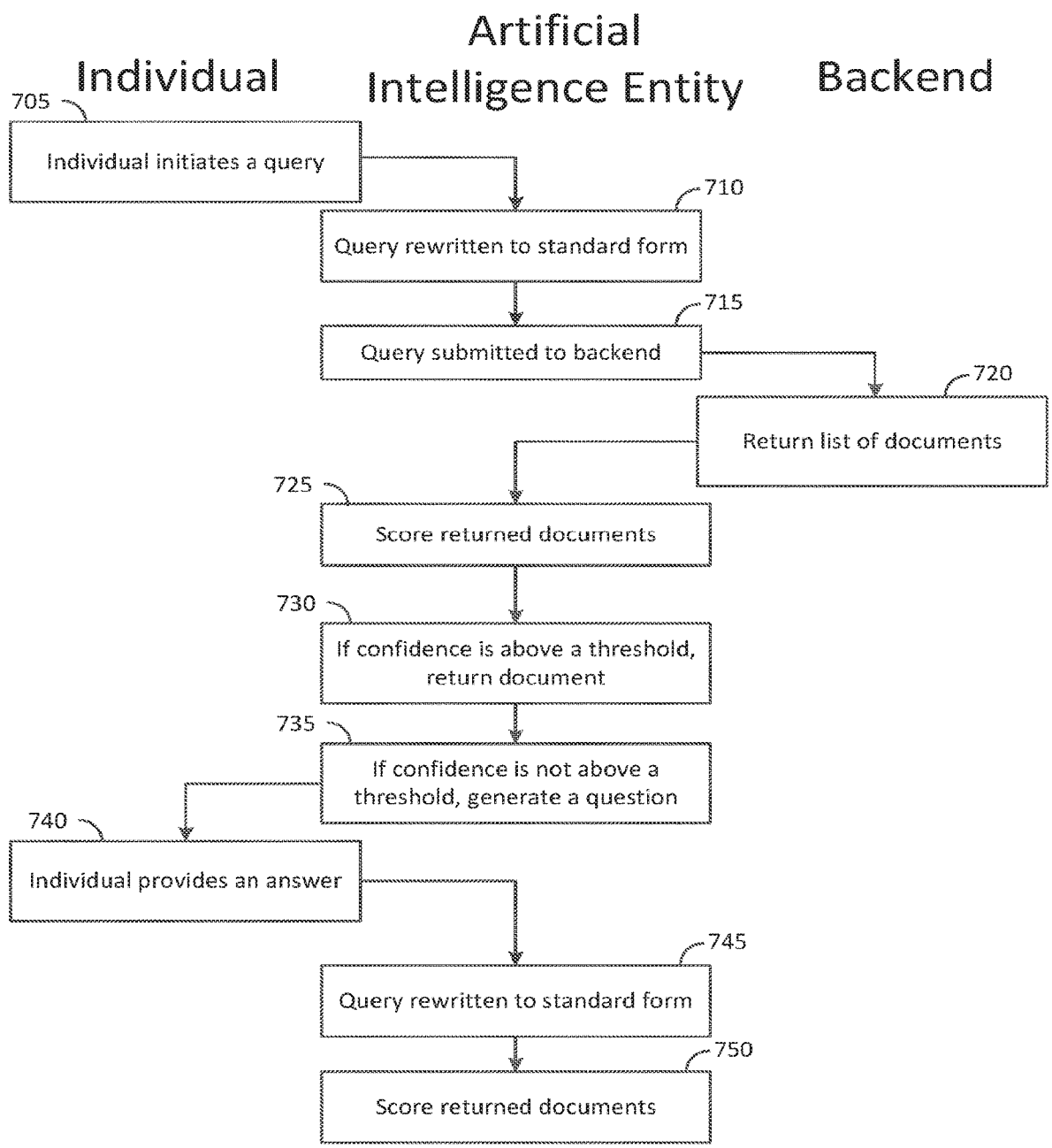
FIG. 7 illustrates an example interaction between an individual and an artificial intelligence entity and a backend according to an example.

FIG. 7 illustrates an example interaction between an individual, an artificial intelligence entity and a backend (e.g., an information retrieval system) in which aspects of the disclosure may be practiced. In the interaction shown in FIG. 7, the artificial intelligence entity serves as the intermediary between the individual and the backend.

Initially, the individual may provide 705 a query to the artificial intelligence entity such as described above. In this example, the query may be "How to connect my table to a TV."

Once the query is received, the artificial intelligence entity rewrites 710 the query using sequence-to-sequence as previously described. Once the query is rewritten (e.g., tablet TV connector) the query is submitted 715 to a backend.

The backend performs a search using the rewritten query and returns 720 a list of documents to the artificial intelligence entity. In this example, the documents may include information about HDMI cables, mini HDMI cables, VGA cables and so on.

The artificial intelligence entity then scores 725 the returned documents based on the probability that the document will be pertinent to the query. In some cases, the scoring may be generated by the projection layer such as described above. For example, the scores for the various terms may be: HDMI cable 0.5; Mini HDMI cable 0.4; and VGA cable 0.1.

If the artificial intelligence entity is confident in the results (e.g., the confidence is above a threshold), the artificial intelligence entity may return 730 a document to the individual (e.g., "Do you want this mini HDMI cable?").

However, if the confidence level is not above the threshold, the artificial intelligence entity may generate 735 a question that prompts the individual for additional information (e.g., "What size cable do you want?").

Once the question is received, the individual may provide 740 an answer (e.g., "I want mini HDMI cable"). The artificial intelligence entity rewrites 745 the answer (represented as a query) to standard form using the sequence-to-sequence model described above and performs a search such as previously described and receives one or more documents. The documents are then scored 750 and the relevant documents may be returned to the individual.

Figure 8:
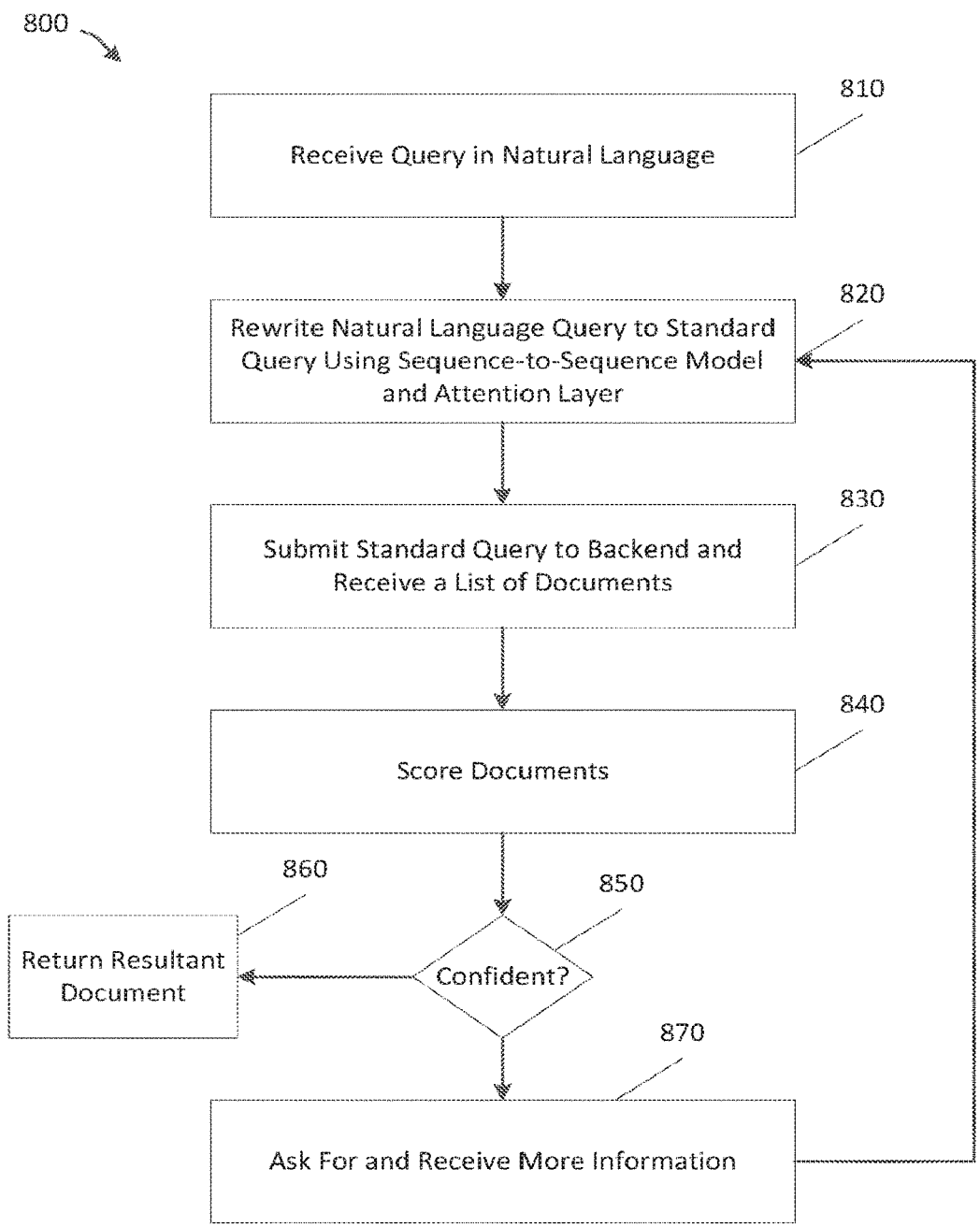
FIG. 8 illustrates a flow chart of the query response system according to an example.

FIG. 8 illustrates a method 800 for returning various documents to an individual in response to a received query. In some cases, the method 800 may be performed by the system 100 shown and described above with respect to FIG. 1.

Method 800 begins at operation 810 in which a query is received. In some cases, the query may be in a first format (e.g., a natural language format).

Once the query is received, flow proceeds to operation 820 and the query is changed or rewritten such that the query is in a second format. In some cases, the second format may be a standard format that is suitable for various information retrieval systems. As described above, the query may be rewritten using a sequence-to-sequence model. The sequence-to-sequence model may also include an attention layer such as described above.

Flow then proceeds to operation 830 and the standard query is provided to a backend server. The backend server performs a search using the rewritten query and returns a list of documents. In some cases, the list of documents is scored in operation 840 by the sequence-to-sequence model and/or the artificial intelligence entity as previously described.

Flow then proceeds to operation 850 and a confidence level of the documents are determined. For example, if one of the scores yield a document with confidence or score higher than a threshold value, then the resultant document is returned to the individual that submitted the query is operation 860.

However, if the confidence or score of the resultant documents is below a threshold, flow proceeds to operation 870 and additional information is requested using one or more generated follow up questions. In some cases, the result of the follow up question may be rewritten and sent to the backend as a search request. Any resultant documents may be scored such as described and one or more of the operations of the method 800 may be repeated.

Figure 9:
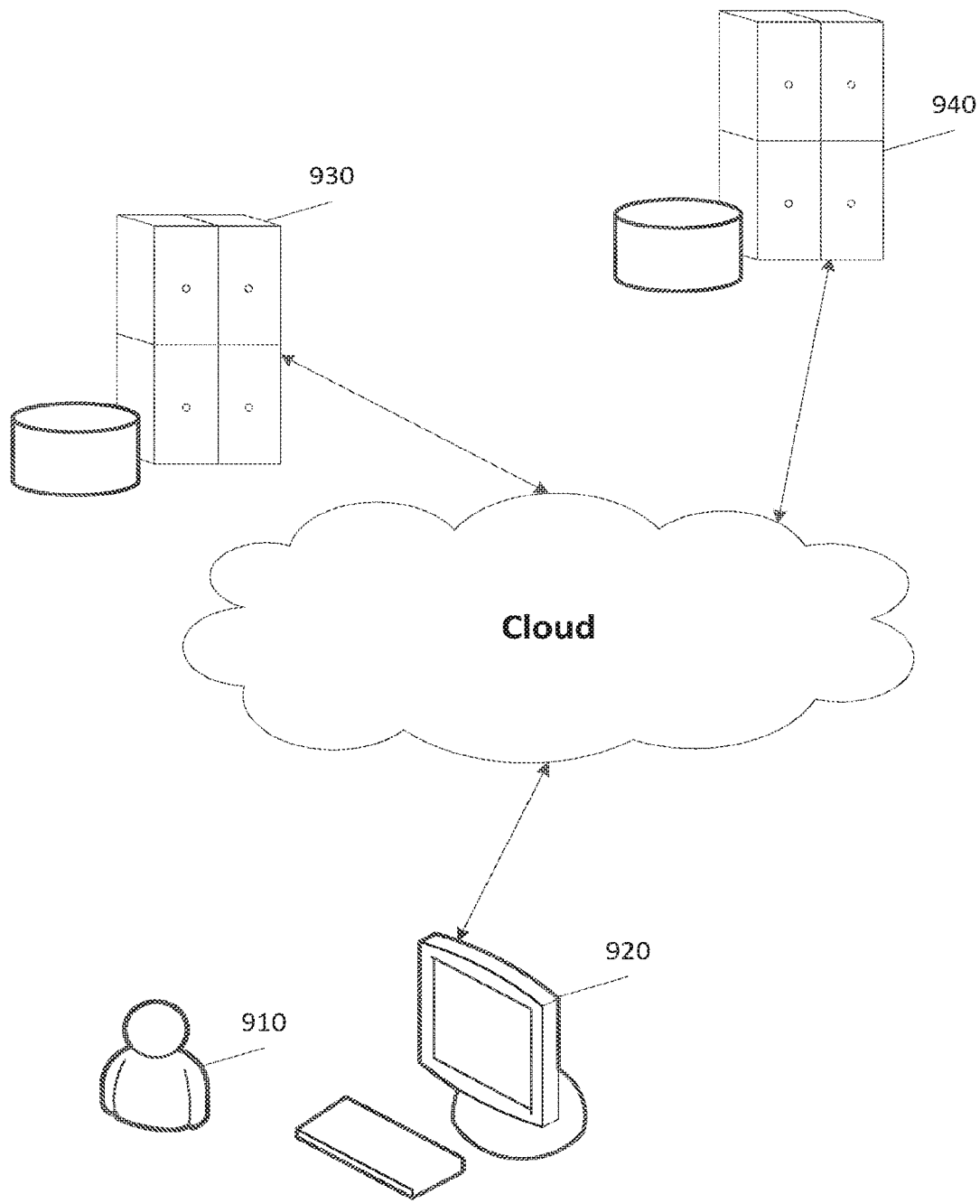
FIG. 9 illustrates a system diagram of the query response system according to an example.

FIG. 9 illustrates a system diagram of a query response system in which aspects of the disclosure may be practiced. A user 910 uses a local computing device 920 to initiate a query. The query passes to a bot server 930 which implements the functions described above to take the natural language query, convert it to a standard query, execute a search of a backend server 940, receive results of the search, score the search results, and provide either a follow-up question or a search result to user 910 via local computing device 920.

Figure 10:
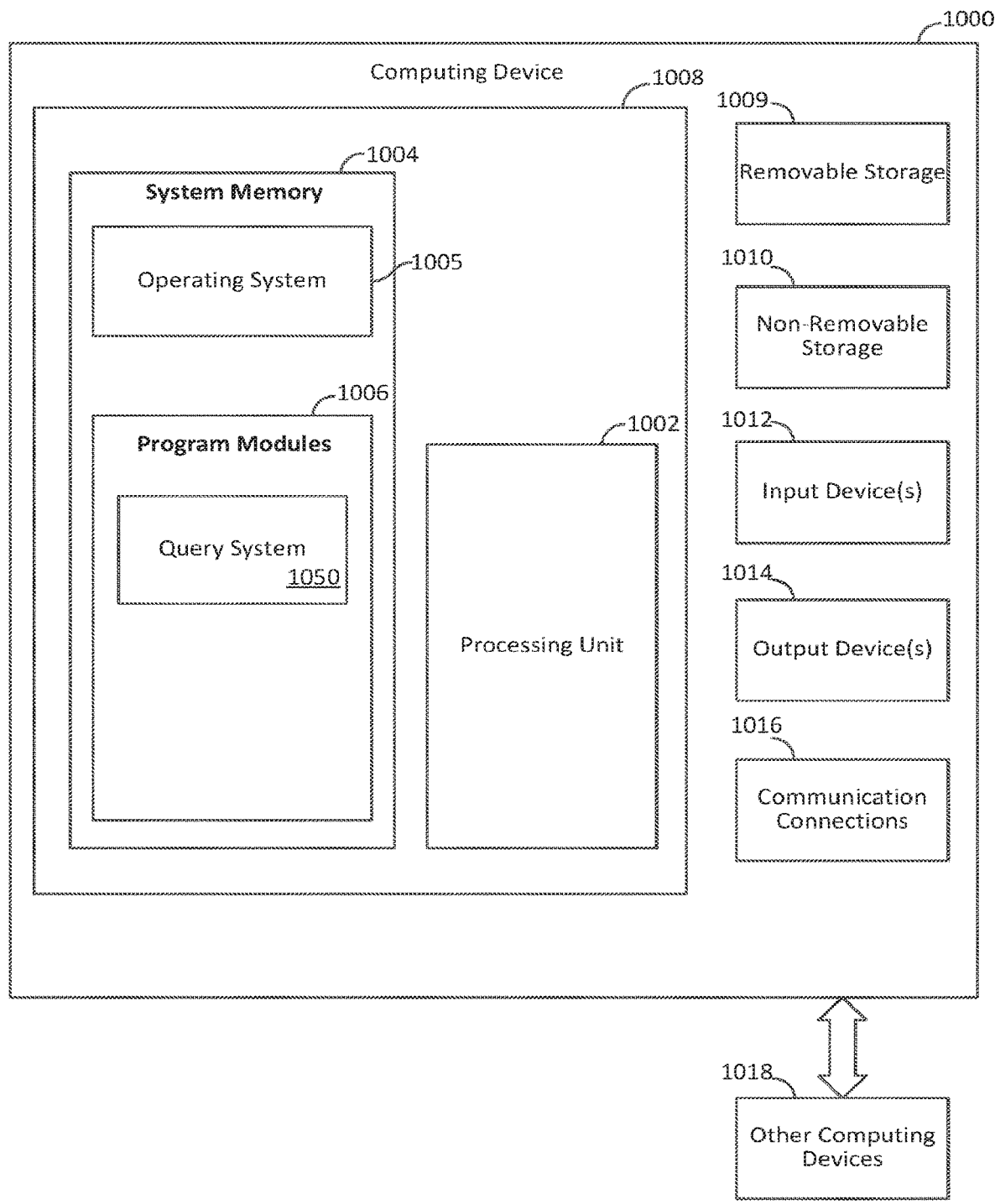
FIG. 10 is a block diagram illustrating example physical components of a computing device according to an example.
Figure 11A:
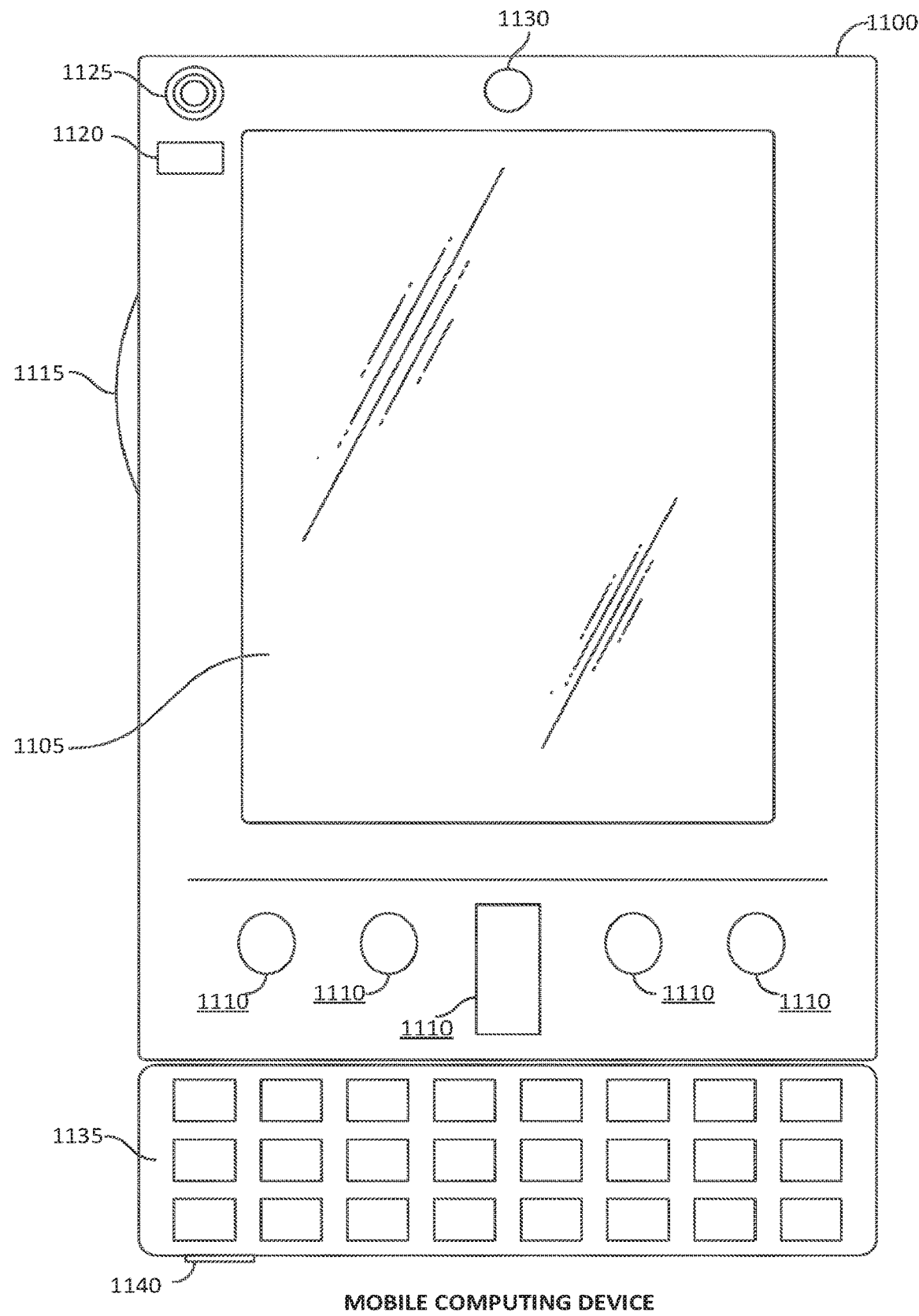
FIGS. 11A and 11B are simplified block diagrams of a mobile computing device according to an example.
Figure 11B:
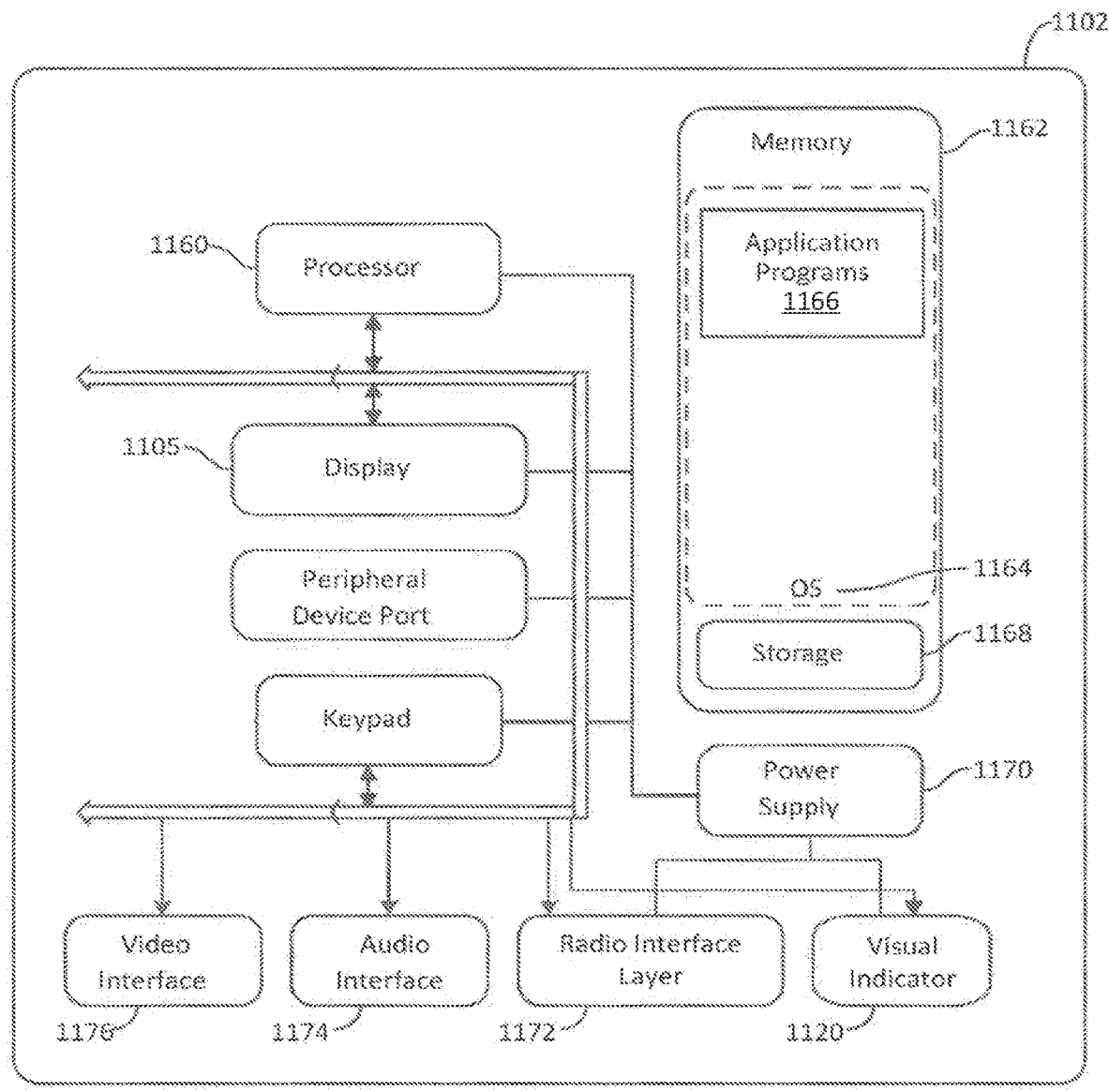

FIGS. 10-11 and the associated descriptions provide a discussion of a variety of operating environments in which aspects of the disclosure may be practiced. However, the devices and systems illustrated and discussed with respect to FIGS. 10-11B are for purposes of example and illustration and are not limiting of a vast number of computing device configurations that may be utilized for practicing aspects of the disclosure, as described herein.

FIG. 10 is a block diagram illustrating physical components (e.g., hardware) of a computing device 1000 with which aspects of the disclosure may be practiced. The computing device components described below may have computer executable instructions for implementing a query system 1050 on a computing device, including computer executable instructions that can be executed to implement the methods disclosed herein. In a basic configuration, the computing device 1000 may include at least one processing unit 602 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 606 suitable for running query system 1050.

The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., query system 1050) may perform processes including, but not limited to, the aspects, as described herein. Other program modules that may be used in accordance with aspects of the present disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1018. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as email or other messages used by an email application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for providing a queue analysis application.

The system 1102 has a power supply 1170, which may be implemented as one or more batteries. The power supply 1170 may further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer 1125 (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 1B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 11A and 11B are described for purposes of illustrating the present methods and systems and are not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A query response system comprising:
    a processor; and
    memory storing computer executable instructions that when executed cause the processor to:
        rewrite a natural language query to a machine-readable query using a sequence-to-sequence model;
        perform a search using the machine-readable query;
        receive a document from the search;
        determine a relevance of the document with respect to the natural language query, wherein the relevance is based, at least in part, on a conditional entropy of the document; and
        generating a question in response to determining that the document is not relevant, the question having a perplexity measurement associated with the conditional entropy, such that an answer to the question is configured to reduce an expected conditional entropy of a subsequently received document.

2. The system of claim 1, further comprising computer executable instructions that when executed cause the processor to:
    return the document received from the search.

3. The system of claim 2, computer executable instructions that when executed cause the processor to:
    receive the answer associated with the question;
    rewrite the answer from a natural language format to a second machine-readable query using the sequence-to-sequence model; and
    perform a second search using the machine readable query and the second machine-readable query.

4. The system of claim 3, further comprising computer executable instructions that when executed cause the processor to:
    receive a second document from the second search;
    determine a second relevance of the second document with respect to the answer, wherein the relevance is based, at least in part, on a conditional entropy of the second document; and
    return the second document when it is determined that the second document is relevant.

5. The system of claim 1, further comprising computer executable instructions that when executed cause the processor to:
    determine that the document is relevant when a confidence score exceeds a threshold value.

6. The system of claim 5, wherein the conditional entropy is inversely related to the confidence score.

7. The system of claim 1, further comprising computer executable instructions that when executed cause the processor to:
    convert the natural language query to a machine-readable query using an attention layer associated with the sequence-to-sequence model.

8. The system of claim 1, wherein the sequence-to-sequence model is a deep long-short term memory network.

9. The system of claim 1, further comprising computer executable instructions that when executed cause the processor to:
    determine the conditional entropy based on the document and the natural language query.

10. The system of claim 1, wherein the conditional entropy is associated with a perplexity measurement of the natural language query.

11. A computer implemented method comprising:
    converting a natural language query to a machine-readable query using a sequence-to-sequence model;
    performing a search using the machine-readable query;
    receiving search results from the machine-readable query;
    determining a relevance of the search results with respect to the natural language query, wherein the relevance is based, at least in part on, the natural language query and the search results; and
    based on the search results being relevant or not relevant:
        returning the search results, in response to determining that the search results are relevant; or
        generating a question, in response to determining that the search results are not relevant.

12. The method of claim 11, wherein the sequence-to-sequence model is associated with an attention layer.

13. The method of claim 12, wherein the attention layer aggregates hidden vectors associated with the machine-readable query.

14. The method of claim 11, wherein the relevance is based, at least in part, on a conditional entropy of the search results.

15. The method of claim 11, wherein the question has a perplexity measurement associated with the conditional entropy, such that an answer to the question is configured to reduce an expected conditional entropy of subsequently received search results.

16. A method, comprising:
    receiving, via a computing device, a natural language query;

rewriting the natural language query as a machine-readable query using a sequence-to-sequence model;
performing a search using the machine-readable query;
receiving a document from the search;
determining a confidence score that indicates a relevance of the document with respect to the natural language query, wherein the confidence score is based, at least in part, on a conditional entropy of the document;
returning the document when the confidence score is at or above a threshold value; and
generating a question in response to determining that the confidence score is below the threshold value, the question having a perplexity measurement associated with the conditional entropy, such that an answer to the question is configured to reduce an expected conditional entropy of a subsequently received document.

17. The method of claim 16, wherein the sequence-to-sequence model is associated with an attention layer.

18. The method of claim 17, wherein the attention layer aggregates hidden vectors associated with the machine-readable query.

19. The method of claim 16, wherein the sequence-to-sequence model is a multi-layer recurrent neural network.

20. The method of claim 16, further comprising:
using search click data to rewrite the natural language query as a machine-readable query.

* * * * *